United States Patent
Ito

(10) Patent No.: US 12,330,673 B2
(45) Date of Patent: Jun. 17, 2025

(54) DRIVING ASSISTANCE APPARATUS, DRIVING ASSISTANCE METHOD, AND COMPUTER-READABLE STORAGE MEDIUM STORING DRIVING ASSISTANCE PROGRAM

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 257 days.

(21) Appl. No.: 18/323,821

(22) Filed: May 25, 2023

(65) Prior Publication Data
US 2024/0051565 A1     Feb. 15, 2024

(30) Foreign Application Priority Data
Aug. 9, 2022   (JP) ................................. 2022-126988

(51) Int. Cl.
*B60W 50/14*     (2020.01)
*B60W 60/00*     (2020.01)

(52) U.S. Cl.
CPC .......... *B60W 50/14* (2013.01); *B60W 60/001* (2020.02); *B60W 60/0051* (2020.02); *B60W 2540/21* (2020.02); *B60W 2540/215* (2020.02)

(58) Field of Classification Search
CPC .............. B60W 50/14; B60W 60/001; B60W 60/0051; B60W 2540/21;
(Continued)

(56) References Cited

U.S. PATENT DOCUMENTS

| 8,355,851 B2 | 1/2013 | Inoue et al. |
| 8,370,040 B2 | 2/2013 | Inoue et al. |

(Continued)

FOREIGN PATENT DOCUMENTS

| JP | 2017030518 A | * | 2/2017 | ............... B60T 7/22 |
| JP | 2021-66226 A | | 4/2021 | |

(Continued)

OTHER PUBLICATIONS

Machine translation of WO-2018168018-A1 downloaded from IP.com Mar. 3, 2025 (Year: 2025)*

(Continued)

*Primary Examiner* — Kito R Robinson
*Assistant Examiner* — Tanya C Sienko
(74) *Attorney, Agent, or Firm* — Sughrue Mion, PLLC

(57) ABSTRACT

A driving assistance apparatus executes a moving control to autonomously control a vehicle. The apparatus informs a driver of contents of a voice operation process planned to be executed for the moving control in accordance with utterance contents of the driver acquired by voice recognition, and execute the voice operation process when an approval operation to approve the informed contents, is performed by the driver. The apparatus cancels a plan to execute the voice operation process and informs the driver that executing the voice operation process is not permitted when a moving situation of the vehicle becomes a predetermined situation which does not permit executing the voice operation process after informing the driver of the contents of the voice operation process planned to be executed for the moving control and before the approval operation is performed.

3 Claims, 10 Drawing Sheets

(58) Field of Classification Search
CPC ....... B60W 2540/215; B60W 60/0053; B60W 2420/403; B60W 2552/15; B60W 2552/30; B60W 2552/53; B60W 2554/408; B60W 2556/15; B60W 2556/20; B60W 2556/65; B60W 50/08; B60W 60/00
See application file for complete search history.

(56) References Cited

U.S. PATENT DOCUMENTS

| | | | |
|---|---|---|---|
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |
| 2019/0295419 | A1 | 9/2019 | Tosa et al. |
| 2021/0114584 | A1* | 4/2021 | Hiratsuka ............. B60W 30/00 |
| 2021/0268902 | A1* | 9/2021 | Kojima ................. B60W 50/14 |

FOREIGN PATENT DOCUMENTS

| | | |
|---|---|---|
| JP | 2022-022075 A | 2/2022 |
| WO | WO-2018168018 A1 * | 9/2018 |

OTHER PUBLICATIONS

Machine translation of JP-2017030518-A downloaded from IP.com Mar. 20, 2025 (Year: 2025)*

Toyota TConnect Service Agent; 9 pgs; https://toyota.jp/tconnectservice/service/agent.html.

* cited by examiner

DRIVING ASSISTANCE APPARATUS, DRIVING ASSISTANCE METHOD, AND COMPUTER-READABLE STORAGE MEDIUM STORING DRIVING ASSISTANCE PROGRAM

CROSS-REFERENCE TO RELATED APPLICATIONS

This application claims priority to Japanese patent application No. JP 2022-126988 filed on Aug. 9, 2022, the content of which is hereby incorporated by reference in its entirety.

BACKGROUND

Field

The invention relates to a driving assistance apparatus, a driving assistance method, and a computer-readable storage medium storing a driving assistance program.

Description of the Related Art

There is known a driving assistance apparatus which executes a moving control to autonomously control a moving of a vehicle. The moving control may include automatic driving controls such as a constant speed control (a so-called cruise control) and a following moving control (a so-called adaptive cruise control).

As the driving assistance apparatus, there is also known the driving assistance apparatus which informs a driver of the vehicle of contents of a voice operation process planned to be executed for the moving control in accordance with contents acquired by voice recognition of utterance contents of the driver, requests the driver to perform an approval operation to approve the informed contents, and executes the voice operation process when the approval operation is performed (for example, see JP 2021-66226 A).

After requesting the driver to perform the approval operation and before the approval operation is performed, a situation of the vehicle may change to a situation which does not permit executing the voice operation process. In this case, the voice operation process should not be executed.

Also, the situation which does not permit executing the voice operation process may occur after the approval operation is performed, or after the utterance contents of the driver are recognized by the voice recognition. In this case, if the voice operation process is executed, the moving control may become unsuitable.

An object of the invention is to provide a driving assistance apparatus, a driving assistance method, and a computer-readable storage medium storing a driving assistance program which can prevent the voice operation process having the contents which are not permitted due to the moving situation of the vehicle from being executed.

A driving assistance apparatus according to the invention comprises an electronic control unit configured to execute a moving control to autonomously control a vehicle. The electronic control unit being configured to inform a driver of the vehicle of contents of a voice operation process planned to be executed for the moving control in accordance with utterance contents of the driver acquired by voice recognition. The electronic control unit is further configured to execute the voice operation process when an approval operation to approve the informed contents, is performed by the driver.

The electronic control unit according to the invention is configured to cancel a plan to execute the voice operation process and inform the driver that executing the voice operation process is not permitted when a moving situation of the vehicle becomes a predetermined situation which does not permit executing the voice operation process after the electronic control unit informs the driver of the contents of the voice operation process planned to be executed for the moving control and before the approval operation is performed.

Alternatively, the electronic control unit according to the invention is configured to cancel the plan to execute the voice operation process and inform the driver that executing the voice operation process is not permitted when the moving situation of the vehicle is predicted to become the predetermined situation after the electronic control unit informs the driver of the contents of the voice operation process planned to be executed for the moving control and before the approval operation is performed.

Alternatively, the electronic control unit according to the invention is configured to cancel the plan to execute the voice operation process and inform the driver that executing the voice operation process is not permitted when the moving situation of the vehicle becomes the predetermined situation when and after the electronic control unit acquires the utterance contents of the driver by the voice recognition and before the electronic control unit completes informing the driver of the contents of the voice operation process planned to be executed for the moving control.

Alternatively, the electronic control unit according to the invention is configured to cancel the plan to execute the voice operation process and inform the driver that executing the voice operation process is not permitted when the moving situation of the vehicle is predicted to become the predetermined situation when and after the electronic control unit acquires the utterance contents of the driver by the voice recognition and before the electronic control unit completes informing the driver of the contents of the voice operation process planned to be executed for the moving control.

With the driving assistance apparatus according to the invention, the plan to execute the voice operation process is cancelled, and the driver is informed that executing the voice operation process is not permitted when the moving situation of the vehicle becomes the situation which does not permit executing the voice operation process after the contents of the voice operation process planned to be executed, is informed the driver and before the approval operation is performed by the driver. Thus, the voice operation process having the contents which are not permitted due to the moving situation of the vehicle, can be prevented from being executed.

Alternatively, with the driving assistance apparatus according to the invention, the plan to execute the voice operation process is cancelled, and the driver is informed that executing the voice operation process is not permitted when the moving situation of the vehicle is predicted to become the situation which does not permit executing the voice operation process after the contents of the voice operation process planned to be executed, is informed the driver and before the approval operation is performed by the driver. Thus, the voice operation process having the contents which are predicted to become not permitted due to the moving situation of the vehicle, can be prevented from being executed.

Alternatively, with the driving assistance apparatus according to the invention, the plan to execute the voice operation process is cancelled, and the driver is informed that executing the voice operation process is not permitted when the moving situation of the vehicle becomes the situation which does not permit executing the voice operation process when and after the electronic control unit acquires the utterance contents of the driver by the voice recognition and before the electronic control unit completes informing the driver of the contents of the voice operation process planned to be executed for the moving control. Thus, the voice operation process having the contents which are predicted to become not permitted due to the moving situation of the vehicle, can be prevented from being executed.

Alternatively, with the driving assistance apparatus according to the invention, the plan to execute the voice operation process is cancelled, and the driver is informed that executing the voice operation process is not permitted when the moving situation of the vehicle is predicted to become the situation which does not permit executing the voice operation process when and after the electronic control unit acquires the utterance contents of the driver by the voice recognition and before the electronic control unit completes informing the driver of the contents of the voice operation process planned to be executed for the moving control. Thus, the voice operation process having the contents which are predicted to become not permitted due to the moving situation of the vehicle, can be prevented from being executed.

A driving assistance method according to the invention is a method of executing a moving control to autonomously control a vehicle. The driving assistance method comprising a step of informing a driver of the vehicle of contents of a voice operation process planned to be executed for the moving control in accordance with utterance contents of the driver acquired by voice recognition. The driving assistance method further comprises a step of executing the voice operation process when an approval operation to approve the informed contents, is performed by the driver.

The driving assistance method according to the invention comprises a step of cancelling a plan to execute the voice operation process and informing the driver that executing the voice operation process is not permitted when a moving situation of the vehicle becomes a predetermined situation which does not permit executing the voice operation process after informing the driver of the contents of the voice operation process planned to be executed for the moving control and before the approval operation is performed.

Alternatively, the driving assistance method according to the invention comprises a step of cancelling the plan to execute the voice operation process and informing the driver that executing the voice operation process is not permitted when the moving situation of the vehicle is predicted to become the predetermined situation after informing the driver of the contents of the voice operation process planned to be executed for the moving control and before the approval operation is performed.

Alternatively, the driving assistance method according to the invention comprises a step of cancelling the plan to execute the voice operation process and informing the driver that executing the voice operation process is not permitted when the moving situation of the vehicle becomes the predetermined situation when and after the acquiring the utterance contents of the driver by the voice recognition and before completing informing the driver of the contents of the voice operation process planned to be executed for the moving control.

Alternatively, the driving assistance method according to the invention comprises a step of cancelling the plan to execute the voice operation process and informing the driver that executing the voice operation process is not permitted when the moving situation of the vehicle is predicted to become the predetermined situation when and after acquiring the utterance contents of the driver by the voice recognition and before completing informing the driver of the contents of the voice operation process planned to be executed for the moving control.

A computer-readable storage medium according to the invention is a medium which stores a driving assistance program configured to execute a moving control to autonomously control a vehicle. The driving assistance program is configured to inform a driver of the vehicle of contents of a voice operation process planned to be executed for the moving control in accordance with utterance contents of the driver acquired by voice recognition. The driving assistance program is further configured to execute the voice operation process when an approval operation to approve the informed contents, is performed by the driver.

The driving assistance program according to the invention is configured to cancel a plan to execute the voice operation process and inform the driver that executing the voice operation process is not permitted when a moving situation of the vehicle becomes a predetermined situation which does not permit executing the voice operation process after informing the driver of the contents of the voice operation process planned to be executed for the moving control and before the approval operation is performed.

Alternatively, the driving assistance program according to the invention is configured to cancel the plan to execute the voice operation process and inform the driver that executing the voice operation process is not permitted when the moving situation of the vehicle is predicted to become the predetermined situation after informing the driver of the contents of the voice operation process planned to be executed for the moving control and before the approval operation is performed.

Alternatively, the driving assistance program according to the invention is configured to cancel the plan to execute the voice operation process and inform the driver that executing the voice operation process is not permitted when the moving situation of the vehicle becomes the predetermined situation when and after acquiring the utterance contents of the driver by the voice recognition and before completing informing the driver of the contents of the voice operation process planned to be executed for the moving control.

Alternatively, the driving assistance program according to the invention is configured to cancel the plan to execute the voice operation process and inform the driver that executing the voice operation process is not permitted when the moving situation of the vehicle is predicted to become the predetermined situation when and after acquiring the utterance contents of the driver by the voice recognition and before completing informing the driver of the contents of the voice operation process planned to be executed for the moving control.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
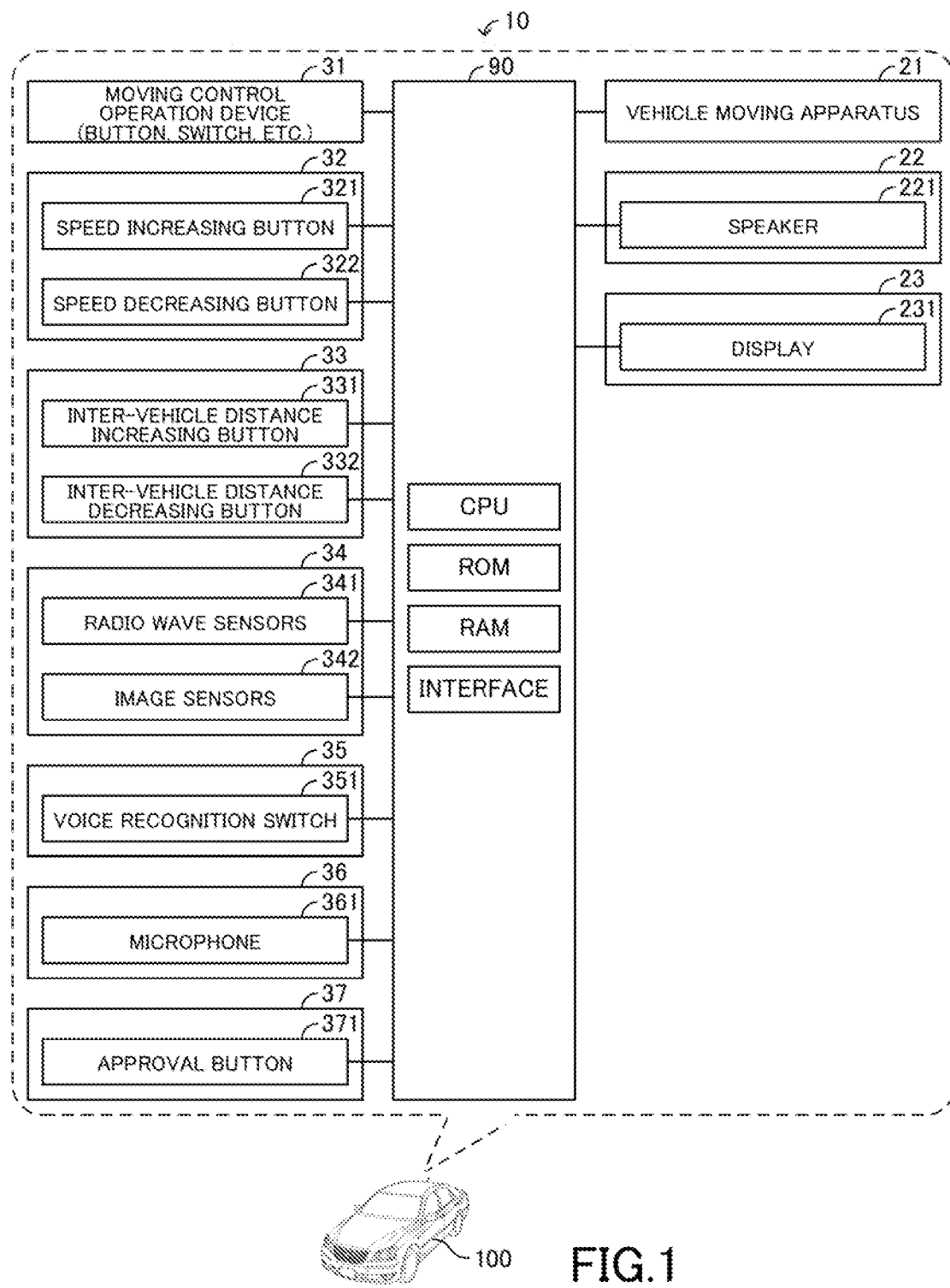
FIG. 1 is a view which shows a driving assistance apparatus according to an embodiment of the invention and a vehicle or an own vehicle installed with the driving assistance apparatus.

Below, a driving assistance apparatus, a driving assistance method, and a computer-readable storage medium storing a driving assistance program according to an embodiment of the invention will be described with reference to the drawings. As shown in FIG. 1, the driving assistance apparatus 10 according to the embodiment of the invention is installed on a vehicle or an own vehicle 100.

The driving assistance apparatus 10 includes an ECU 90, a vehicle moving apparatus 21, an informing device 22, a displaying device 23, a moving control operation device 31, a set speed setting operation device 32, an inter-vehicle distance setting operation device 33, a surrounding information detection apparatus 34, a voice recognition operation device 35, a voice acquisition device 36, and an approval operation device 37.

ECU stands for electronic control unit. The ECU 90 includes a micro-computer as a main component. The micro-computer includes a CPU, a ROM, a RAM, a non-volatile memory, and an interface. The CPU is configured or programmed to realize various functions by executing instructions, programs, or routines stored in the ROM.

In this embodiment, the driving assistance apparatus 10 includes the single ECU 90. In this regard, the driving assistance apparatus 10 may include ECUs and be configured to realize predetermined functions by the ECUs, respectively.

The vehicle moving apparatus 21 is an apparatus which applies a driving force or a driving torque to the own vehicle 100, applies a braking force or a braking torque to the own vehicle 100, and applies a steering force or a steering torque to the own vehicle 100. The vehicle moving apparatus 21 is electrically connected to the ECU 90. The ECU 90 controls operations of the vehicle moving apparatus 21.

The informing device 22 is a device which outputs announcements. In this embodiment, the informing device 22 is a speaker 221. The speaker 221 is electrically connected to the ECU 90. The ECU 90 outputs various announcements from the speaker 221. In this embodiment, the speaker 221 is provided such that a driver of the own vehicle 100 can hear the announcements.

The displaying device 23 is a device which displays images. In this embodiment, the displaying device 23 is a display 231. The display 231 is electrically connected to the ECU 90. The ECU 90 displays various images on the display 231. In this embodiment, the display 231 is provided such that the driver of the own vehicle 100 can see the display 231.

The moving control operation device 31 is a device such as a button or a switch operated by the driver to request the ECU 90 to execute or terminate executing a moving control. The moving control operation device 31 is, for example, provided on a steering wheel of the own vehicle 100.

The moving control is a control executed for the own vehicle 100 to autonomously control a moving of the own vehicle 100. In particular, the moving control is a control to autonomously change or control a motion of the own vehicle 100. In this embodiment, the moving control includes a constant speed moving control and a following moving control. The constant speed moving control is a control to autonomously accelerate or decelerate the own vehicle 100 to maintain a moving speed V of the own vehicle 100 at a constant speed or a set speed Vset. On the other hand, the following moving control is a control to autonomously accelerate or decelerate the own vehicle 100 to maintain an inter-vehicle distance D, i.e., a distance between the own vehicle 100 and a preceding vehicle 200 at a constant distance or a target inter-vehicle distance Dtgt. In this embodiment, the inter-vehicle distance D is acquired, based on surrounding detection information IS.

The moving control operation device 31 is electrically connected to the ECU 90. When the moving control operation device 31 is operated, the moving control operation device 31 sends a signal to the ECU 90. When the ECU 90 receives the signal from the moving control operation device 31 while the moving control is not executed, the ECU 90 determines that the moving control is requested to be executed. On the other hand, when the ECU 90 receives the signal from the moving control operation device 31 while the moving control is executed, the ECU 90 determines that an execution of the moving control is requested to be terminated.

Figure 2A:
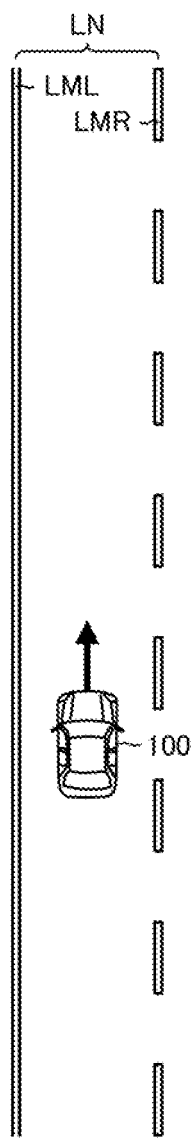
FIG. 2A is a view which shows a scene that the own vehicle is moved by a constant speed moving control.

When (i) the ECU 90 determines that the moving control is requested to be executed, (ii) a predetermined condition or a moving control precondition is satisfied, and (iii) there is no preceding vehicle 200 as shown in FIG. 2A, the ECU 90 executes the constant speed moving control. In this embodiment, the moving control precondition is a precondition for appropriately moving the own vehicle 100 by the moving control. The moving control precondition is, for example, a condition that devices such as the vehicle moving apparatus 21 and the surrounding information detection apparatus 34 normally operate. Further, in this embodiment, whether there is the preceding vehicle 200, is determined, based on the surrounding detection information IS.

Figure 2B:
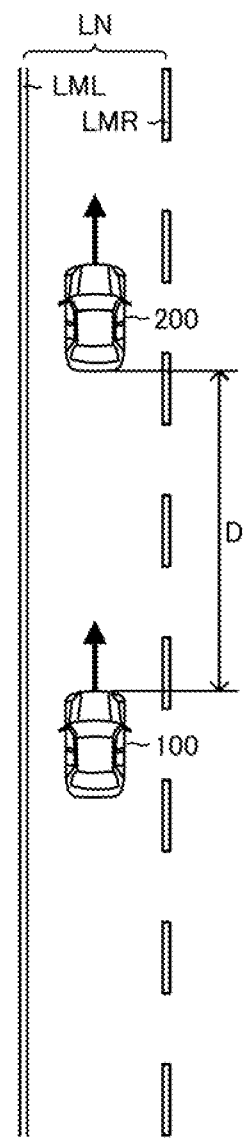
FIG. 2B is a view which shows a scene that the own vehicle is moved by a following moving control.

On the other hand, when (i) the ECU 90 determines that the moving control is requested to be executed, (ii) the predetermined condition or the moving control precondition is satisfied, and (iii) there is the preceding vehicle 200 as shown in FIG. 2B, the ECU 90 executes the following moving control. It should be noted that the preceding vehicle 200 is a vehicle moving in an own vehicle moving lane LN within a predetermined distance from the own vehicle 100 ahead of the own vehicle 100. In FIG. 2A and FIG. 2B, a reference symbol LML denotes a left lane marking which defines the own vehicle moving lane LN, and a reference symbol LMR denotes a right lane marking which defines the own vehicle moving lane LN.

The set speed setting operation device 32 is a device operated by the driver to set the set speed Vset used by the constant speed moving control. The set speed setting operation device 32 is, for example, provided on the steering wheel of the own vehicle 100. In this embodiment, the set speed setting operation device 32 includes a speed increasing button 321 and a speed decreasing button 322. The speed increasing button 321 is a device operated by the driver to increase the set speed Vset. The speed decreasing button 322 is a device operated by the driver to decrease the set speed Vset.

The speed increasing button 321 and the speed decreasing button 322 are electrically connected to the ECU 90. When the speed increasing button 321 is operated, the speed increasing button 321 sends a signal to the ECU 90. Also, when the speed decreasing button 322 is operated, the speed decreasing button 322 sends a signal to the ECU 90. When the ECU 90 receives the signal from the speed increasing button 321 while the constant speed moving control is executed, the ECU 90 increases the set speed Vset. On the other hand, when the ECU 90 receives the signal from the speed decreasing button 322 while the constant speed moving control is executed, the ECU 90 decreases the set speed Vset.

The inter-vehicle distance setting operation device 33 is a device operated by the driver to set the target inter-vehicle distance Dtgt used by the following moving control. The inter-vehicle distance setting operation device 33 is, for example, provided on the steering wheel of the own vehicle 100. In this embodiment, the inter-vehicle distance setting operation device 33 includes an inter-vehicle distance increasing button 331 and an inter-vehicle distance decreasing button 332. The inter-vehicle distance increasing button 331 is a device operated by the driver to increase the target inter-vehicle distance Dtgt. The inter-vehicle distance decreasing button 332 is a device operated by the driver to decrease the target inter-vehicle distance Dtgt.

The inter-vehicle distance increasing button 331 and the inter-vehicle distance decreasing button 332 are electrically connected to the ECU 90. When the inter-vehicle distance increasing button 331 is operated, the inter-vehicle distance increasing button 331 sends a signal to the ECU 90. Also, when the inter-vehicle distance decreasing button 332 is operated, the inter-vehicle distance decreasing button 332 sends a signal to the ECU 90. When the ECU 90 receives the signal from the inter-vehicle distance increasing button 331 while the following moving control is executed, the ECU 90 increases the target inter-vehicle distance Dtgt. On the other hand, when the ECU 90 receives the signal from the inter-vehicle distance decreasing button 332 while the following moving control is executed, the ECU 90 decreases the target inter-vehicle distance Dtgt.

The surrounding information detection apparatus 34 is an apparatus which detects information on a situation around the own vehicle 100. In this embodiment, the surrounding information detection apparatus 34 includes radio wave sensors 341 and image sensors 342. The radio wave sensor 341 is, for example, a radar sensor such as a millimeter wave radar. The image sensor 342 is, for example, a camera. It should be noted that the surrounding information detection apparatus 34 may include sound wave sensors such as ultrasonic sensors 34 such as clearance sonars or optical sensors such as laser radars such as LiDARs.

The radio wave sensors 341 are electrically connected to the ECU 90. The radio wave sensor 341 transmits radio waves outside of the own vehicle 100 and receives reflected waves, i.e., the radio waves reflected by objects around the own vehicle 100. The radio wave sensor 341 sends detection result, i.e., information on the transmitted radio waves and the received reflected waves to the ECU 90. In other words, the radio wave sensor 341 detects objects around the own vehicle 100 and send the detection result, i.e., the information on the detected objects to the ECU 90. The ECU 90 acquires the information on the objects around the own vehicle 100 as the surrounding detection information IS, based on radio wave information, i.e., the information sent from the radio wave sensors 341. In this embodiment, the objects may be vehicles, motor cycles, bicycles, and persons.

The image sensors 342 are electrically connected to the ECU 90. The image sensor 342 takes or captures images of a view around the own vehicle 100 and sends information on the taken images (i.e., captured images or camera images) to the ECU 90. The ECU 90 acquires the information on the situation around the own vehicle 100 as the surrounding detection information IS, based on the information sent from the image sensors 342 (taken image information, captured image information, or camera image information).

The voice recognition operation device 35 is a device operated by the driver to cause the ECU 90 to execute a voice recognition process described later in detail. In this embodiment, the voice recognition operation device 35 is a voice recognition switch 351. The voice recognition switch 351 is electrically connected to the ECU 90. When the voice recognition switch 351 is operated, the voice recognition switch 351 sends a signal to the ECU 90. When the ECU 90 receives the signal sent from the voice recognition switch 351, the ECU 90 determines that the voice recognition switch 351 is operated.

The voice acquisition device 36 is a device which detects sound. In this embodiment, the voice acquisition device 36 is a microphone 361. The microphone 361 is electrically connected to the ECU 90. When the microphone 361 detects the sound, the microphone 361 sends signals corresponding to the detected sound to the ECU 90. When the ECU 90 receives the signals sent from the microphone 361, the ECU 90 acquires the sound, based on the received signals. In this embodiment, the microphone 361 is provided so as to detect voices of the driver of the own vehicle 100.

The approval operation device 37 is a device operated by the driver to approve an execution of a voice operation process, i.e., a process in accordance with contents acquired by voice recognition of utterance contents of the driver acquired through the microphone 361 as described later in detail. In this embodiment, the approval operation device 37 is an approval button 371. The approval button 371 is electrically connected to the ECU 90. When the approval button 371 is operated, the approval button 371 sends a signal to the ECU 90. When the ECU 90 receives the signal from the approval button 371 while the ECU 90 stands ready to execute the voice operation process after the ECU 90 recognizes the utterance contents by the voice recognition, the ECU 90 determines that an approval operation is performed.

It should be noted that the ECU 90 may be configured to display an approval image, i.e., an image operated by the driver to approve the execution of the voice operation process on the display 231 and determine that the approval operation is performed when a touch interaction is applied to the approval image while the ECU 90 stands ready to execute the voice operation process after the ECU 90 recognizes the utterance contents of the driver by the voice recognition.

<Summary of Operations of Driving Assistance Apparatus>

Next, a summary of operations of the driving assistance apparatus 10 will be described.

When the voice recognition switch 351 is operated while the driving assistance apparatus 10 does not execute the voice recognition process, the driving assistance apparatus 10 starts to execute the voice recognition process. On the other hand, when the voice recognition switch 351 is operated while the driving assistance apparatus 10 executes the voice recognition process, the driving assistance apparatus 10 terminates executing the voice recognition process.

The voice recognition process is a process to recognize the utterance contents of the driver of the own vehicle 100 by the voice recognition and acquire the recognized utterance contents as voice recognition contents. In this embodiment, the voice recognition process is a process to recognize the utterance contents of the driver acquired through the microphone 361 by the voice recognition and acquire the recognized utterance contents as the voice recognition contents.

While the constant speed moving control is executed, the driver can set the set speed Vset by operating the speed increasing button 321 or the speed decreasing button 322. In addition, when the voice recognition process is executed, the driver can set the set speed Vset by utterance regarding the set speed Vset.

Similarly, while the following moving control is executed, the driver can set the target inter-vehicle distance Dtgt by operating the inter-vehicle distance increasing button 331 or the inter-vehicle distance decreasing button 332. In addition, when the voice recognition process is executed, the driver can change the target inter-vehicle distance Dtgt by the utterance regarding the target inter-vehicle distance Dtgt.

When the driving assistance apparatus 10 acquires the utterance contents of the driver as the voice recognition contents while the voice recognition process is executed, the driving assistance apparatus 10 outputs a first announcement, i.e., an announcement to inform the driver of contents of a voice operation process planned to be executed for the moving control in accordance with the acquired voice recognition contents from the speaker 221.

Following the first announcement, the driving assistance apparatus 10 outputs a second announcement, i.e., an announcement to request the driver to perform the approval operation to approve the contents of the voice operation process informed by the first announcement from the speaker 221.

In this regard, the driving assistance apparatus 10 may be configured to output the first announcement and the second announcement following the first announcement as far as a vehicle motion control condition is satisfied when the driving assistance apparatus 10 recognizes the utterance contents of the driver by the voice recognition while the voice recognition process is executed. The vehicle motion control condition is a condition that the contents of the voice operation process are contents to change a motion of the own vehicle 100. The contents to change the motion of the own vehicle 100 is, for example, contents which require accelerating or decelerating the own vehicle 100, or steering the own vehicle 100. Thus, the contents to change the motion of the own vehicle 100 do not include contents to turn on or off a room light of the own vehicle 100.

When the approval operation is performed before a predetermined time or a predetermined ready time Tw from starting outputting the second announcement from the speaker 221, elapses, the driving assistance apparatus 10 executes the voice operation process.

For example, when the driver speaks a speed which the driver desires as the set speed Vset, the driving assistance apparatus 10 outputs (i) the first announcement to inform the contents of the voice operation process planned to be executed for the moving control in accordance with the voice recognition contents, i.e., the utterance contents acquired by the voice recognition and (ii) the second announcement to request the driver to perform the approval operation. Then, the driving assistance apparatus 10 executes the voice operation process, i.e., the process to set the speed which the driver speaks to the set speed Vset when the approval operation is performed before the predetermined ready time Tw elapses.

Alternatively, when the driver speaks a distance which the driver desires as the target inter-vehicle distance Dtgt, the driving assistance apparatus 10 outputs (i) the first announcement to inform the contents of the voice operation process planned to be executed for the moving control in accordance with the voice recognition contents, i.e., the utterance contents acquired by the voice recognition and (ii) the second announcement to request the driver to perform the approval operation. Then, the driving assistance apparatus 10 executes the voice operation process, i.e., the process to set the distance which the driver speaks to the target inter-vehicle distance Dtgt when the approval operation is performed before the predetermined ready time Tw elapses.

In this regard, when the approval operation is not performed before the predetermined ready time Tw elapses, that is, when the predetermined ready time Tw elapses without performing the approval operation, the driving assistance apparatus 10 outputs an announcement to inform that the voice operation process is not executed from the speaker 221. In this case, the driving assistance apparatus 10 does not execute the voice operation process.

When the driver speaks contents to increase the set speed Vset, the contents which the driver speaks, are recognized by the voice recognition, and (i) the first announcement to inform the driver of the contents of the voice operation process planned to be executed for the moving control in accordance with the voice recognition contents recognized by the voice recognition and (ii) the second announcement to request the driver to perform the approval operation, are output from the speaker 221. In this case, when the speed decreasing button 322 is operated after the first and second announcements are output from the speaker 221 and before the predetermined ready time Tw elapses, the contents of the voice operation process planned to be executed and the contents which the driver desires by operating the speed decreasing button 322, are different. In this case, if the voice operation process is executed in response to the approval operation being performed, the voice operation process having the contents different from the contents which the driver desires by operating the speed decreasing button 322, is adversely executed.

As described above, an environment or a situation of the own vehicle 100 changes and may become one which does not permit executing the voice operation process before the predetermined ready time Tw elapses, that is, the approval operation is performed. In this case, if the voice operation process is executed in response to the approval operation being performed, the voice operation process which is not permitted, is adversely executed.

Accordingly, the driving assistance apparatus 10 cancels a plan to execute the voice operation process when a first non-permission condition is satisfied before the predetermined ready time Tw elapses. The first non-permission condition is a predetermined condition for determining that executing the voice operation process is not permitted.

In addition, when the first non-permission condition becomes satisfied, and the driving assistance apparatus 10 cancels the plan to execute the voice operation process, the driving assistance apparatus 10 outputs a third announcement from the speaker 221. The third announcement is an announcement to inform the driver that executing the voice operation process is not permitted. In this case, the third announcement may include an announcement to inform the driver of reasons for not permitting executing the voice operation process.

Thereby, when the first non-permission condition becomes satisfied after the contents of the voice operation process is informed the driver and before the approval operation is performed by the driver, the voice operation process is not executed, and it is informed the driver that executing the voice operation process is not permitted. Thus, the voice operation process having the contents which are not permitted due to a moving situation of the vehicle (i.e., the moving situation of the own vehicle 100), can be prevented from being executed.

In this embodiment, the first non-permission condition is a condition that the moving situation regarding the moving of the own vehicle 100 is a predetermined situation which does not permit executing the voice operation process. For example, the first non-permission condition includes one or more of conditions described below.

(1) A condition that the utterance contents of the driver are contents to set or change the set speed Vset, and the set speed setting operation device 32 is operated.

(2) A condition that the utterance contents of the driver are contents to set or change the target inter-vehicle distance Dtgt, and the inter-vehicle distance setting operation device 33 is operated.

(3) A condition that the moving control precondition becomes unsatisfied while the constant speed moving control is executed.

(4) A condition that the moving control precondition becomes unsatisfied while the following moving control is executed.

(5) A condition that an autonomous accelerating-decelerating start condition, i.e., a predetermined condition for starting to execute an autonomous accelerating-decelerating control when the driving assistance apparatus 10 is configured to execute the autonomous accelerating-decelerating control in addition to the moving control. The autonomous accelerating-decelerating control is a control to autonomously accelerate or decelerate the own vehicle 100.

(6) A condition that the own vehicle 100 moves on a road such as an expressway in the wrong direction. In this embodiment, whether this condition is satisfied, is determined, based on present position information on the own vehicle 100 acquired, based on GPS signals and map information.

(7) A condition that the own vehicle 100 arrives at a point a predetermined distance short of a juncture of the expressway. In this embodiment, whether this condition is satisfied, is determined, based on the present position information on the own vehicle 100 acquired, based on the GPS signals and the map information.

(8) A condition that the own vehicle 100 arrives at a point a predetermined distance short of a road construction zone. In this embodiment, whether this condition is satisfied, is determined, based on the present position information on the own vehicle 100 acquired, based on the GPS signals and the map information.

(9) A condition that the own vehicle 100 arrives at a point a predetermined distance short of a tollbooth of the expressway. In this embodiment, whether this condition is satisfied, is determined, based on the present position information on the own vehicle 100 acquired, based on the GPS signals and the map information.

The condition that the utterance contents of the driver are contents to set or change the set speed Vset, and the set speed setting operation device 32 is operated, includes four conditions described below. In this regard, this condition may include one or more of the conditions described below.

(1) A condition that the speed decreasing button 322 is operated when the utterance contents of the driver are contents to increase the set speed Vset.

(2) A condition that the speed increasing button 321 is operated when the utterance contents of the driver are contents to decrease the set speed Vset.

(3) A condition that the speed increasing button 321 is operated when the utterance contents of the driver are contents to increase the set speed Vset.

(4) A condition that the speed decreasing button 322 is operated when the utterance contents of the driver are contents to decrease the set speed Vset.

The condition that the utterance contents of the driver are contents to set or change the target inter-vehicle distance Dtgt, and the inter-vehicle distance setting operation device 33 is operated, includes four conditions described below. In this regard, this condition may include one or more of the conditions described below.

(1) A condition that the inter-vehicle distance decreasing button 332 is operated when the utterance contents of the driver are contents to increase the target inter-vehicle distance Dtgt.

(2) A condition that the inter-vehicle distance increasing button 331 is operated when the utterance contents of the driver are contents to decrease the target inter-vehicle distance Dtgt.

(3) A condition that the inter-vehicle distance increasing button 331 is operated when the utterance contents of the driver are contents to increase the target inter-vehicle distance Dtgt.

(4) A condition that the inter-vehicle distance decreasing button 332 is operated when the utterance contents of the driver are contents to decrease the target inter-vehicle distance Dtgt.

It should be noted that when the moving control precondition becomes unsatisfied, an execution of the constant moving control or the following moving control is terminated.

Further, when the autonomous accelerating-decelerating start condition becomes satisfied, the autonomous accelerating-decelerating control starts to be executed. The autonomous accelerating-decelerating control may include a collision avoidance control and/or a moving control. The collision avoidance control is a control to avoid a collision of the own vehicle 100 with an object such as a pedestrian by decelerating and stop the own vehicle 100 when the own vehicle 100 is going to collide with the object. The moving control is a control to recognize a speed limit indicated by a road sign, based on the surrounding detection information IS, in particular, the camera image information, set a target value of the moving speed of the own vehicle 100 as the set moving speed, based on the recognized speed limit, and control an acceleration and a deceleration of the own vehicle 100 so as to maintain the moving speed of the own vehicle 100 at the set moving speed.

It should be noted that the invention is not limited to the aforementioned embodiments, and various modifications can be employed within the scope of the invention.

For example, the own vehicle 100 may change traffic lanes when the own vehicle 100 at a place near the juncture of the expressway. In this case, when the voice operation process is executed in accordance with the utterance contents of the driver in response to the driver speaking the contents to increase the set speed Vset shortly before the own vehicle 100 starts to change the traffic lanes, the own vehicle 100 is accelerated, and the moving speed V of the own vehicle 100 increases. However, the own vehicle 100 adversely arrives at a point of starting to change the traffic lanes soon.

Accordingly, the driving assistance apparatus 10 cancels the plan to execute the voice operation process when a second non-permission condition is predicted to become satisfied within a predetermined time or a predetermined prediction time Tp before the predetermined ready time Tw elapses. The second non-permission condition is a condition predetermined for determining that executing the voice operation process is not permitted.

In addition, when the second non-permission condition is predicted to become satisfied within the predetermined prediction time Tp, the driving assistance apparatus 10 output a fourth announcement from the speaker 221. The fourth announcement is an announcement to inform the driver that executing the voice operation process is not permitted. In this regard, the fourth announcement may include an announcement to inform the driver of reasons for not permitting executing the voice operation process.

Thereby, when the moving situation of the own vehicle 100 is predicted to become a situation which does not permit executing the voice operation process after the contents of the voice operation process planned to be executed is informed the driver and before the approval operation is performed by the driver, the voice operation process is not executed, and it is informed the driver that executing the voice operation process is not permitted. Thus, the voice operation process having the contents which are predicted to become not permitted due to the moving situation of the own vehicle 100, can be prevented from being executed.

In this embodiment, the second non-permission condition is a condition that the moving situation of the vehicle (i.e., the moving situation regarding the moving of the own vehicle 100) is the predetermined situation which does not permit executing the voice operation process. In particular, the second non-permission condition is a condition that a road environment (i.e., an environment of a road on which the own vehicle 100 moves), is a predetermined environment which does not permit executing the voice operation process. For example, the second non-permission condition includes one or more of conditions described below.

(1) A condition that the own vehicle 100 arrives at a point a predetermined distance short of the juncture of the expressway. In this embodiment, whether this condition is satisfied, is determined, based on the present position information on the own vehicle 100 acquired, based on the GPS signals and the map information.

(2) A condition that the own vehicle 100 arrives at a point a predetermined distance short of the road construction zone. In this embodiment, whether this condition is satisfied, is determined, based on the present position information on the own vehicle 100 acquired, based on the GPS signals and the map information.

(3) A condition that the own vehicle 100 arrives at a point a predetermined distance short of the tollbooth of the expressway. In this embodiment, whether this condition is satisfied, is determined, based on the present position information on the own vehicle 100 acquired, based on the GPS signals and the map information.

In this regard, when the utterance contents of the driver are recognized by the voice recognition, the first non-permission condition may be already satisfied. Also, the first non-permission condition may become satisfied at the point of time when the utterance contents of the driver are recognized by the voice recognition.

Accordingly, the driving assistance apparatus 10 may be configured to cancel the plan to execute the voice operation process (i) when the utterance contents of the driver are recognized by the voice recognition, and the first non-permission condition is already satisfied, or (ii) when the first non-permission condition becomes satisfied at the point of time when the utterance contents of the driver are recognized by the voice recognition. In this case, the driving assistance apparatus 10 may be configured to output the third announcement from the speaker 221 in addition to cancelling the plan to execute the voice operation process.

Thereby, when the first non-permission condition is satisfied, the voice operation process is not executed. Thus, the voice operation process having the contents which are not permitted due to the moving situation of the vehicle (i.e., the moving situation of the own vehicle 100), can be prevented from being executed.

Further, the second non-permission condition may be predicted to become satisfied within the predetermined prediction time Tp at the point of time when the utterance contents of the driver are recognized by the voice recognition.

Accordingly, the driving assistance apparatus 10 may be configured to cancel the plan to execute the voice operation process when the second non-permission condition is predicted to become satisfied within the predetermined prediction time Tp when the utterance contents of the driver are recognized by the voice recognition. In this case, the driving assistance apparatus 10 may be configured to output the third announcement from the speaker 221 in addition to cancelling the plan to execute the voice operation process.

Thereby, when the moving situation of the own vehicle 100 is predicted to become the situation which does not permit executing the voice operation process when the utterance contents of the driver are recognized by the voice recognition, the voice operation process is not executed, and it is informed the driver that executing the voice operation process is not permitted. Thus, the voice operation process having the contents which are predicted to become not permitted due to the moving situation of the own vehicle 100, can be prevented from being executed.

Further, the driving assistance apparatus 10 may be configured to cancel the plan to execute the voice operation process when the first non-permission condition becomes satisfied after the utterance contents of the driver are recognized by the voice recognition and before outputting the second announcement is completed. In this case, the driving assistance apparatus 10 does not output the first and second announcements when the first non-permission condition becomes satisfied after the utterance contents of the driver are recognized by the voice recognition and before the first announcement starts to be output. Further, the driving assistance apparatus 10 stops outputting the first announcement and does not output the second announcement when the first non-permission condition becomes satisfied while the first announcement is output. Furthermore, the driving assistance apparatus 10 does not output the second announcement when the first non-permission condition becomes satisfied after outputting the first announcement is completed and before the second announcement starts to be output. Furthermore, the driving assistance apparatus 10 stops outputting the second announcement when the first non-permission condition becomes satisfied while the second announcement is output. In this case, the driving assistance apparatus 10 may be configured to output the third announcement from the speaker 221 in addition to cancelling the plan to execute the voice operation process.

Thereby, when the first non-permission condition becomes satisfied, the voice operation process is not executed. Thus, the voice operation process having the contents which are not permitted due to the moving situation of the vehicle (i.e., the moving situation of the own vehicle 100), can be prevented from being executed.

Further, the driving assistance apparatus 10 may be configured to cancel the plan to execute the voice operation process when the second non-permission condition is predicted to become satisfied within the predetermined prediction time Tp after the utterance contents of the driver are recognized by the voice recognition and before outputting the second announcement is completed. In this case, the driving assistance apparatus 10 does not output the first and second announcements when the second non-permission condition is predicted to become satisfied within the predetermined prediction time Tp after the utterance contents of the driver are recognized by the voice recognition and before the first announcement starts to be output. Further, the driving assistance apparatus 10 stops outputting the first announcement and does not output the second announcement when the second non-permission condition is predicted to become satisfied within the predetermined prediction time Tp while the first announcement is output. Furthermore, the driving assistance apparatus 10 does not output the second announcement when the second non-permission condition is predicted to become satisfied within the predetermined prediction time Tp after outputting the first announcement is completed and before the second announcement starts to be output. Furthermore, the driving assistance apparatus 10 stops outputting the second announcement when the second non-permission condition is predicted to become satisfied within the predetermined prediction time Tp while the second announcement is output. In this case, the driving assistance apparatus 10 may be configured to output the third announcement from the speaker 221 in addition to cancelling the plan to execute the voice operation process.

Thereby, when the moving situation of the own vehicle 100 is predicted to become the situation which does not permit executing the voice operation process after the utterance contents of the driver are recognized by the voice recognition and before the contents of the voice operation process planned to be executed for the moving control, is informed the driver, the voice operation process is not executed, and it is informed the driver that executing the voice operation process is not permitted. Thus, the voice operation process having the contents which are predicted to become not permitted due to the moving situation of the own vehicle 100, can be prevented from being executed.

<Specific Operations of Driving Assistance Apparatus>

Next, specific operations of the driving assistance apparatus 10 will be described. The CPU of the ECU 90 of the driving assistance apparatus 10 is configured or programmed to execute a routing shown in FIG. 3 while the voice recognition process is executed with a predetermined calculation cycle. Thus, at a predetermined timing, the CPU starts a process from a step S300 of the routine shown in FIG. 3 and proceeds with the process to a step S305 to determine whether a value of a processing flag X1 is "0."

When the CPU determines "Yes" at the step S305, the CPU proceeds with the process to a step S310 to determines whether the voice recognition contents are acquired by the voice recognition of the utterance contents of the driver.

When the CPU determines "Yes" at the step S310, the CPU proceeds with the process to a step S315 to determine whether the vehicle motion control condition is satisfied.

When the CPU determines "Yes" at the step S315, the CPU proceeds with the process to a step S320 to set the value of the processing flag X1 to "1." Then, the CPU proceeds with the process to a step S395 to terminate executing this routine once.

On the other hand, when the CPU determines "No" at the step S315, the CPU proceeds with the process to a step S325 to execute the voice operation process. Then, the CPU proceeds with the process to the step S395 to terminate executing this routine once.

Further, when the CPU determines "No" at the step S305 or the step S310, the CPU proceeds with the process directly to the step S395 to terminate executing this routine once.

Figure 4:
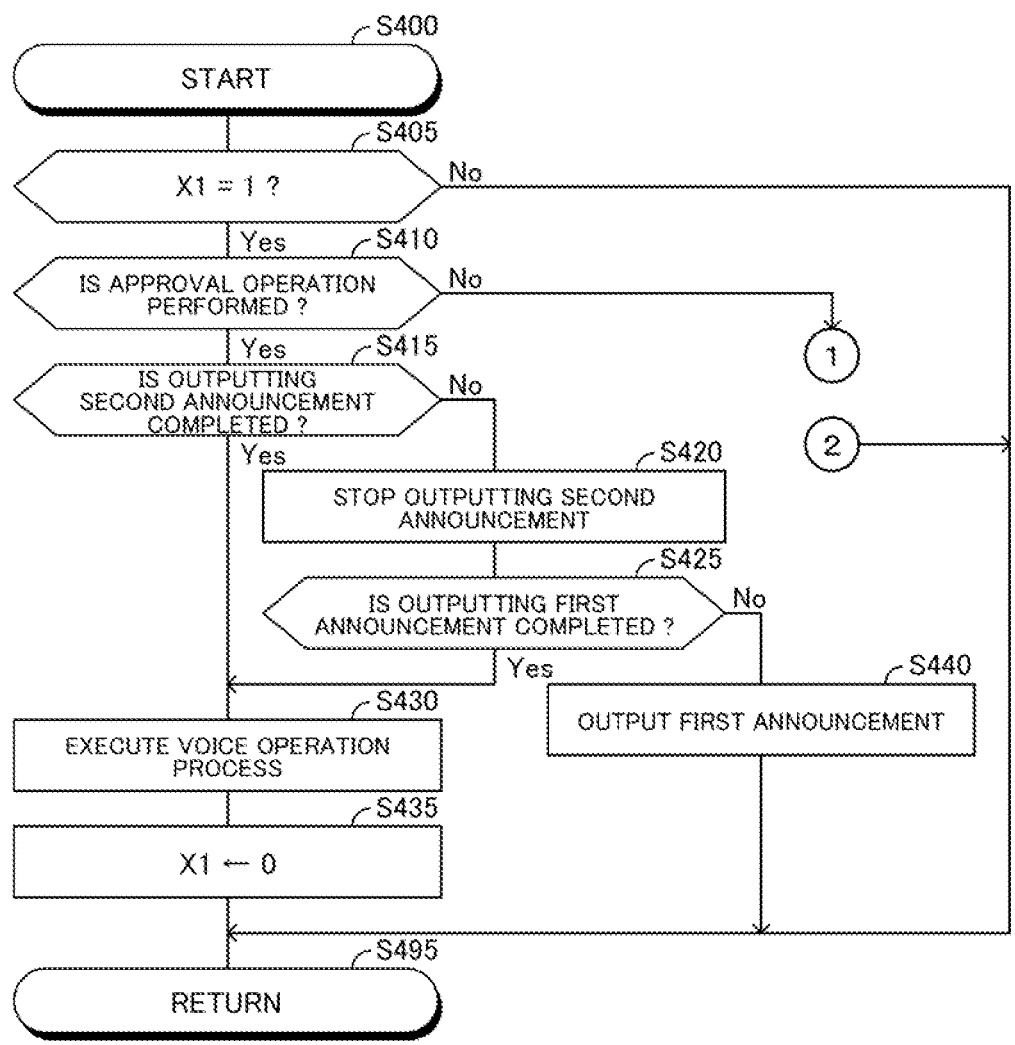
FIG. 4 is a view which shows a flowchart of a routine executed by the driving assistance control according to the embodiment of the invention.

In addition, the CPU is configured or programmed to execute a routine shown in FIG. 4 with the predetermined calculation cycle while the voice recognition process is executed. Thus, at a predetermined timing, the CPU starts a process from a step S400 of the routine shown in FIG. 4 and proceeds with the process to a step S405 to determine whether the value of the processing flag X1 is "1."

When the CPU determines "Yes" at the step S405, the CPU proceeds with the process to a step S410 to determine whether the approval operation is performed.

When the CPU determines "Yes" at the step S410, the CPU proceeds with the process to a step S415 to determine whether outputting the second announcement to request performing the approval operation is completed.

When the CPU determines "Yes" at the step S415, the CPU proceeds with the process to a step S430 to execute the voice operation process. Then, the CPU proceeds with the process to a step S435 to set the value of the processing flag X1 to "0." Then, the CPU proceeds with the process to a step S495 to terminate executing this routine once.

On the other hand, when the CPU determines "No" at the step S415, the CPU proceeds with the process to a step S420 to stop outputting the second announcement from the speaker 221. Then, the CPU proceeds with the process to a step S425 to determine whether outputting the first announcement to inform is completed.

When the CPU determines "Yes" at the step S425, the CPU proceeds with the process to a step S430 to execute the voice operation process. Then, the CPU proceeds with the process to a step S435 to set the value of the processing flag X1 to "0." Then, the CPU proceeds with the process to the step S495 to terminate executing this routine once.

On the other hand, when the CPU determines "No" at the step S425, the CPU proceeds with the process to a step S440 to continue outputting the first announcement from the speaker 221. Then, the CPU proceeds with the process to the step S495 to terminate executing this routine once.

Figure 5:
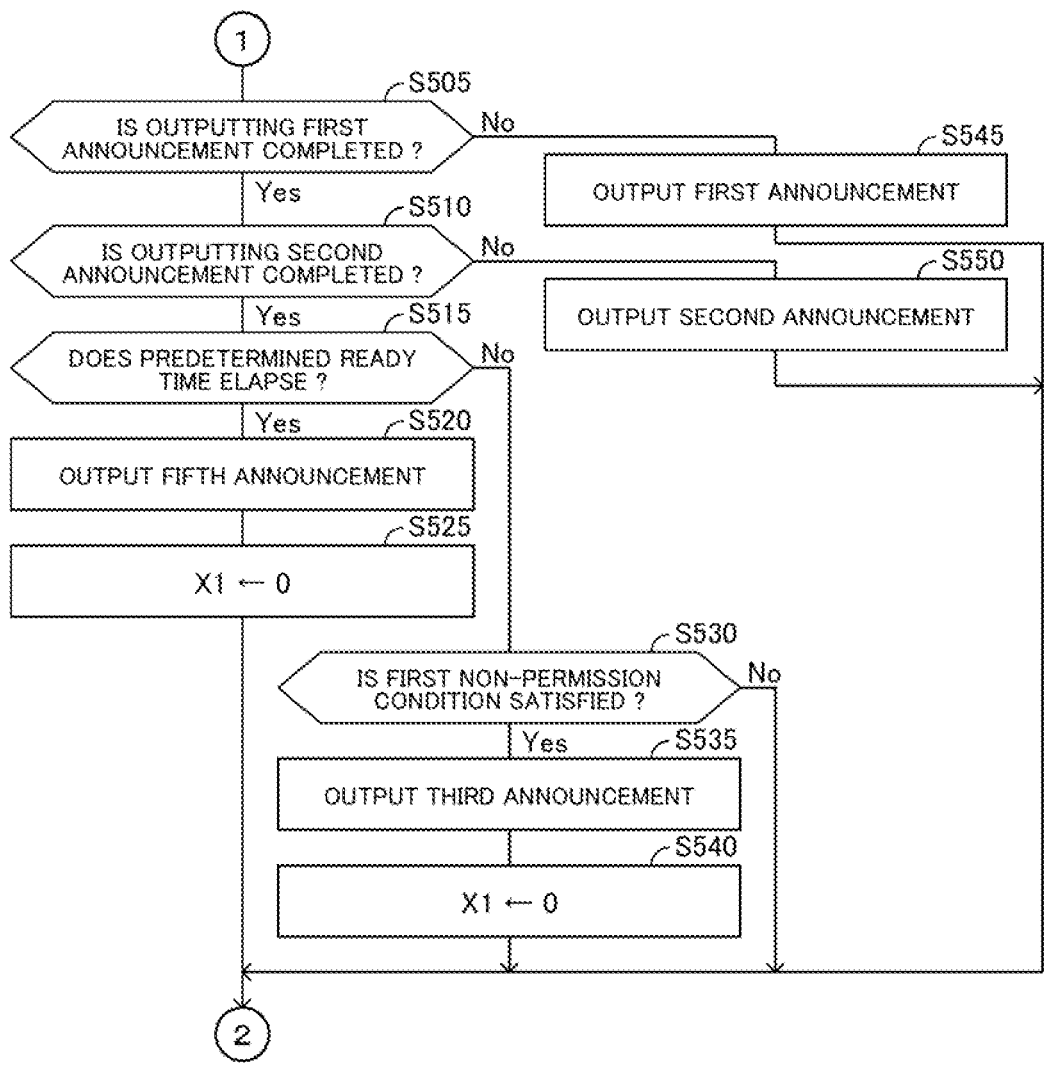
FIG. 5 is a view which shows a flowchart of a routine executed by the driving assistance control according to the embodiment of the invention.

Further, when the CPU determines "No" at the step S410, the CPU proceeds with the process to a step S505 of a routine shown in FIG. 5 to determine whether outputting the first announcement is completed.

When the CPU determines "Yes" at the step S505, the CPU proceeds with the process to a step S510 to determine whether outputting the second announcement is completed.

When the CPU determines "Yes" at the step S510, the CPU proceeds with the process to a step S515 to determine whether the predetermined ready time Tw elapses since outputting the second announcement is completed.

When the CPU determines "Yes" at the step S515, the CPU proceeds with the process to a step S520 to output a fifth announcement from the speaker 221. The fifth announcement is an announcement to inform that the voice operation process is not executed. In this regard, the fifth announcement may include an announcement to inform a reason for not executing the voice operation process. Then, the CPU proceeds with the process to a step S525 to set the value of the processing flag X1 to "0." Then, the CPU proceeds with the process to the step S495 of the routine shown in FIG. 4 to terminate executing this routine once.

On the other hand, when the CPU determines "No" at the step S515, the CPU proceeds with the process to a step S530 to determine whether a first non-permission condition is satisfied.

When the CPU determines "Yes" at the step S530, the CPU proceeds with the process to a step S535 to output the third announcement from the speaker 221. Then, the CPU proceeds with the process to a step S540 to set the value of the processing flag X1 to "0." Then, the CPU proceeds with the process to the step S495 of the routine shown in FIG. 4 to terminate executing this routine once.

On the other hand, when the CPU determines "No" at the step S530, the CPU proceeds with the process directly to the step S495 of the routine shown in FIG. 4 to terminate executing this routine once.

Further, when the CPU determines "No" at the step S505, the CPU proceeds with the process to a step S545 to output or continue outputting the first announcement from the speaker 221. Then, the CPU proceeds with the process to the step S495 of the routine shown in FIG. 4 to terminate executing this routine once.

Further, when the CPU determines "No" at the step S510, the CPU proceeds with the process to a step S550 to output or continue outputting the second announcement from the speaker 221. Then, the CPU proceeds with the process to the step S495 of the routine shown in FIG. 4 to terminate executing this routine once.

Figure 6:
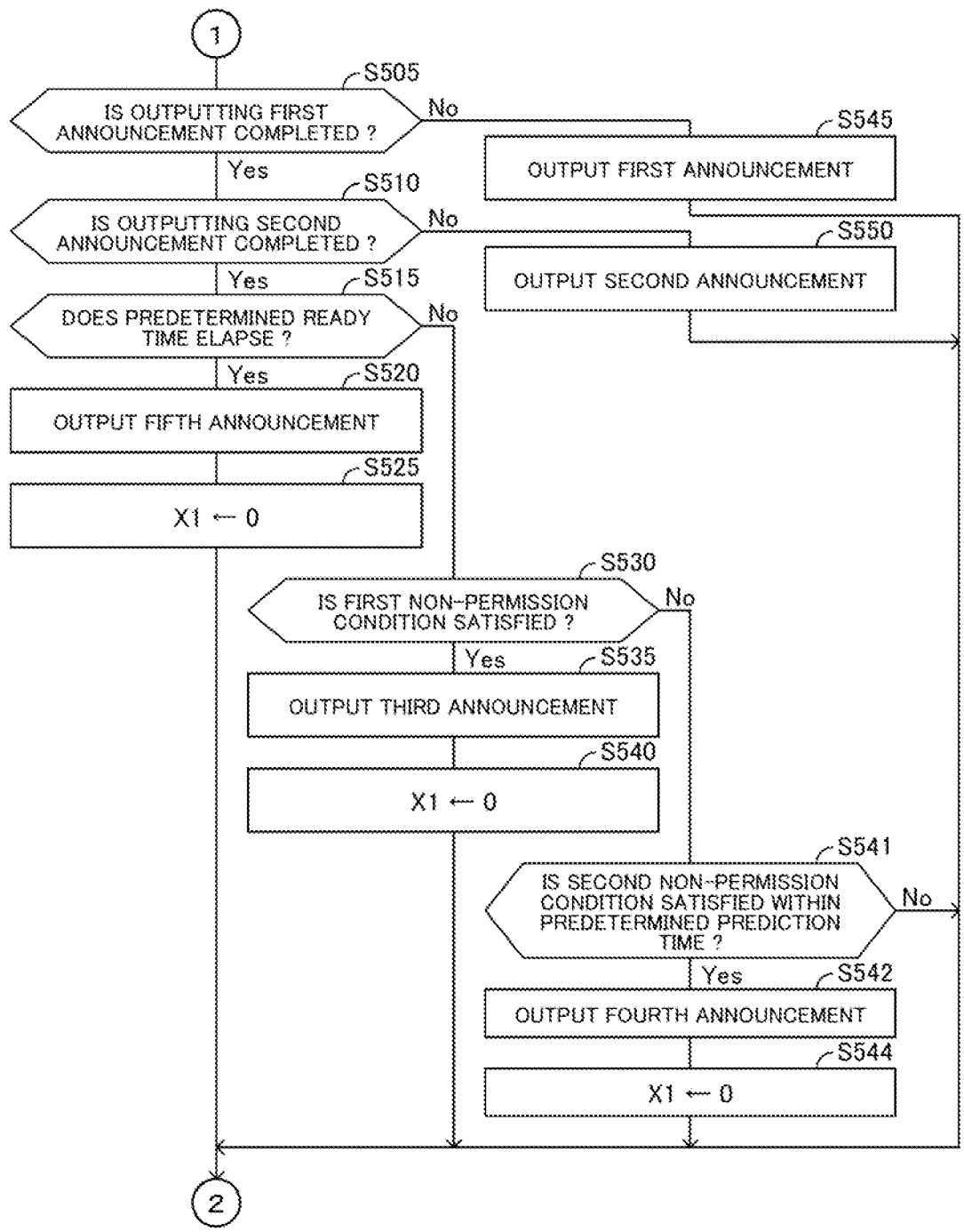
FIG. 6 is a view which shows a flowchart of a routine executed by the driving assistance control according to the embodiment of the invention.

Alternatively, the CPU may be configured or programmed to execute a routine shown in FIG. 6 in place of the routine shown in FIG. 5. In this case, when the CPU determines "No" at the step S410 of the routine shown in FIG. 4 and proceeds with the process to a step S505 of the routine shown in FIG. 6, the CPU determines whether outputting the first announcement is completed.

When the CPU determines "Yes" at the step S505, the CPU proceeds with the process to a step 510 to determine whether outputting the second announcement is completed.

When the CPU determines "Yes" at the step S510, the CPU proceeds with the process to a step S515 to determine whether the predetermined ready time Tw elapses since outputting the second announcement is completed.

When the CPU determines "Yes" at the step S515, the CPU proceeds with the process to a step S520 to output a fifth announcement from the speaker 221. The fifth announcement is an announcement to inform the driver that the voice operation process is not executed. In this regard, the fifth announcement may include an announcement to inform the driver of reasons for not executing the voice operation process. Then, the CPU proceeds with the process to a step S525 to set the value of the processing flag X1 to "0." Then, the CPU proceeds with the process to the step S495 of the routine shown in FIG. 4 to terminate executing this routine once.

On the other hand, when the CPU determines "No" at the step S515 to determine whether the first non-permission condition is satisfied.

When the CPU determines "Yes" at the step S530, the CPU proceeds with the process to a step S535 to output the third announcement from the speaker 221. Then, the CPU proceeds with the process to a step S540 to set the value of the processing flag X1 to "0." Then, the CPU proceeds with the process to the step S495 of the routine shown in FIG. 4 to terminate executing this routine once.

On the other hand, when the CPU determines "No" at the step S530, the CPU proceeds with the process to a step S541 to determine whether the second non-permission condition is predicted to become satisfied within the predetermined prediction time Tp.

When the CPU determines "Yes" at the step S541, the CPU proceeds with the process to a step S542 to output the fourth announcement from the speaker 221. Then, the CPU proceeds with the process to a step S544 to set the value of the processing flag X1 to "0." Then, the CPU proceeds with the process to the step S495 of the routine shown in FIG. 4 to terminate executing this routine once.

On the other hand, when the CPU determines "No" at the step S541, the CPU proceeds with the process directly to the step S495 of the routine shown in FIG. 4 to terminate executing this routine once.

Further, when the CPU determines "No" at the step S505, the CPU proceeds with the process to a step S545 to output or continue outputting the first announcement from the speaker 221. Then, the CPU proceeds with the process to the step S495 of the routine shown in FIG. 4 to terminate executing this routine once.

Further, when the CPU determines "No" at the step S510, the CPU proceeds with the process to a step S550 to output or continue outputting the second announcement from the speaker 221. Then, the CPU proceeds with the process to the step S495 of the routine shown in FIG. 4 to terminate executing this routine once.

Figure 3:
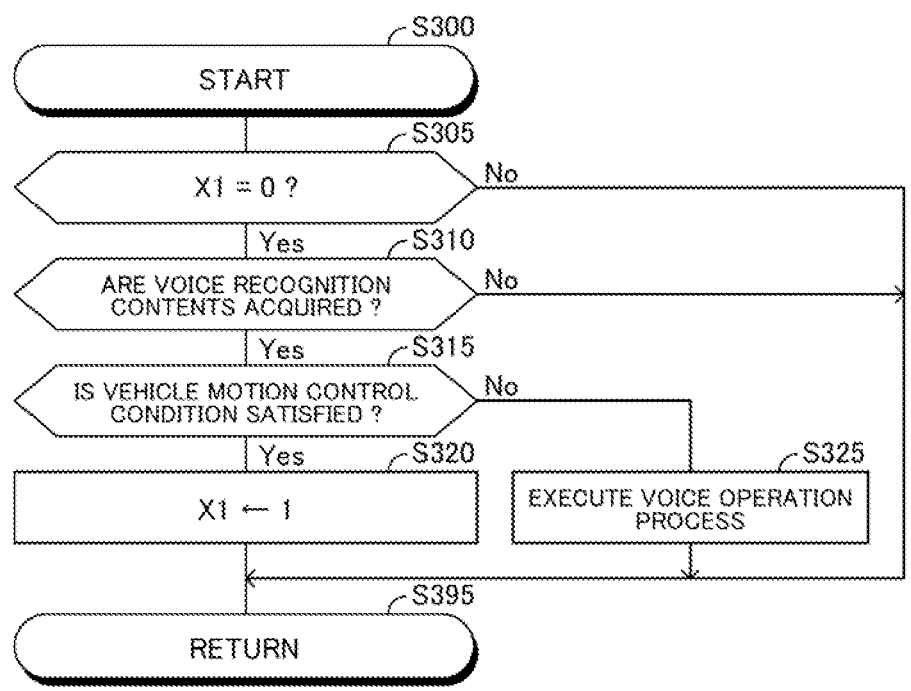
FIG. 3 is a view which shows a flowchart of a routine executed by the driving assistance control according to the embodiment of the invention.
Figure 7:
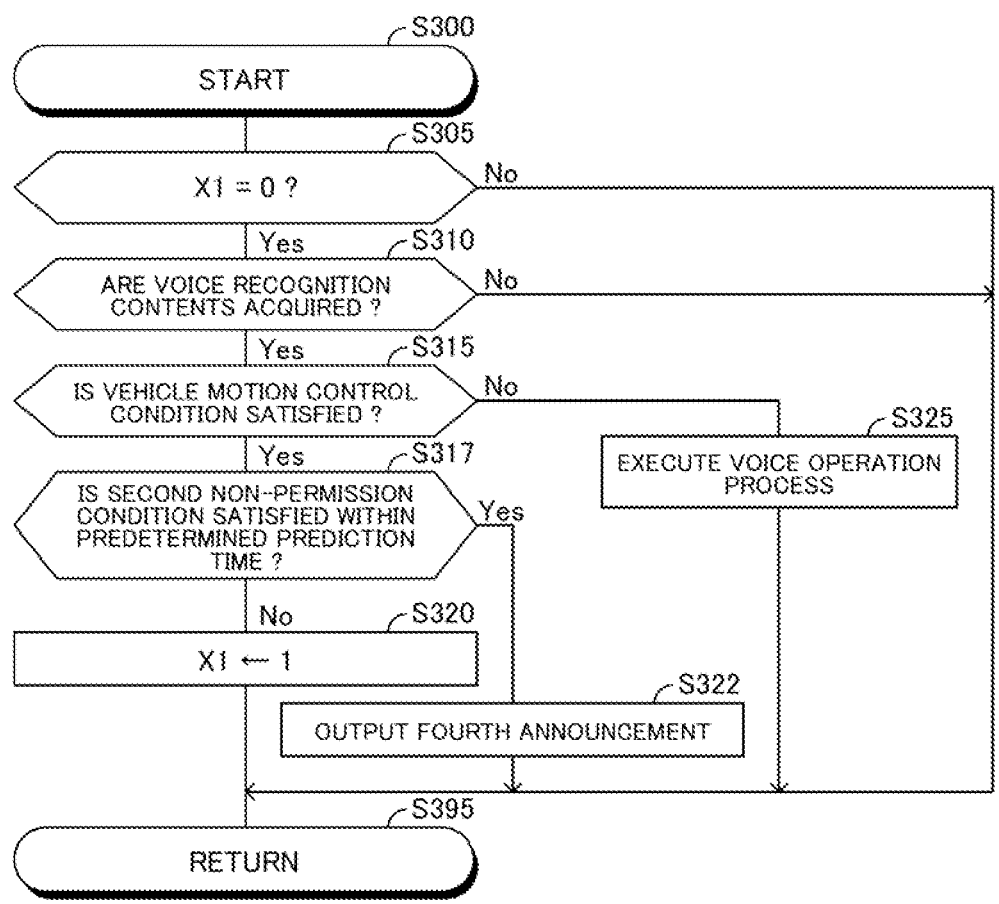
FIG. 7 is a view which shows a flowchart of a routine executed by the driving assistance control according to the embodiment of the invention.

Alternatively, the CPU may be configured or programmed to execute a routine shown in FIG. 7 in place of the routine shown in FIG. 3. In this case, at a predetermined timing, the CPU starts a process from a step S300 of the routine shown in FIG. 7 and proceeds with the process to a step S305 to determine whether the value of the processing flag X1 is "0."

When the CPU determines "Yes" at the step S305, the CPU proceeds with the process to a step S310 to determines whether the voice recognition contents are acquired by the voice recognition of the utterance contents of the driver.

When the CPU determines "Yes" at the step S310, the CPU proceeds with the process to a step S315 to determine whether the vehicle motion control condition is satisfied.

When the CPU determines "Yes" at the step S315, the CPU proceeds with the process to a step S317 to determine whether the second non-permission condition is predicted to become satisfied within the predetermined prediction time Tp.

When the CPU determines "Yes" at the step S317, the CPU proceeds with the process to a step S320 to set the value of the processing flag X1 to "1." Then, the CPU proceeds with the process to a step S395 to terminate executing this routine once.

When the CPU determines "Yes" at the step S317, the CPU proceeds with the process to a step S322 to output the fourth announcement from the speaker 221. Then, the CPU proceeds with the process to a step S395 to terminate executing this routine once.

On the other hand, when the CPU determines "No" at the step S315, the CPU proceeds with the process to a step S325 to execute the voice operation process. Then, the CPU proceeds with the process to the step S395 to terminate executing this routine once.

Further, when the CPU determines "No" at the step S305 or the step S310, the CPU proceeds with the process directly to the step S395 to terminate executing this routine once.

Figure 8:
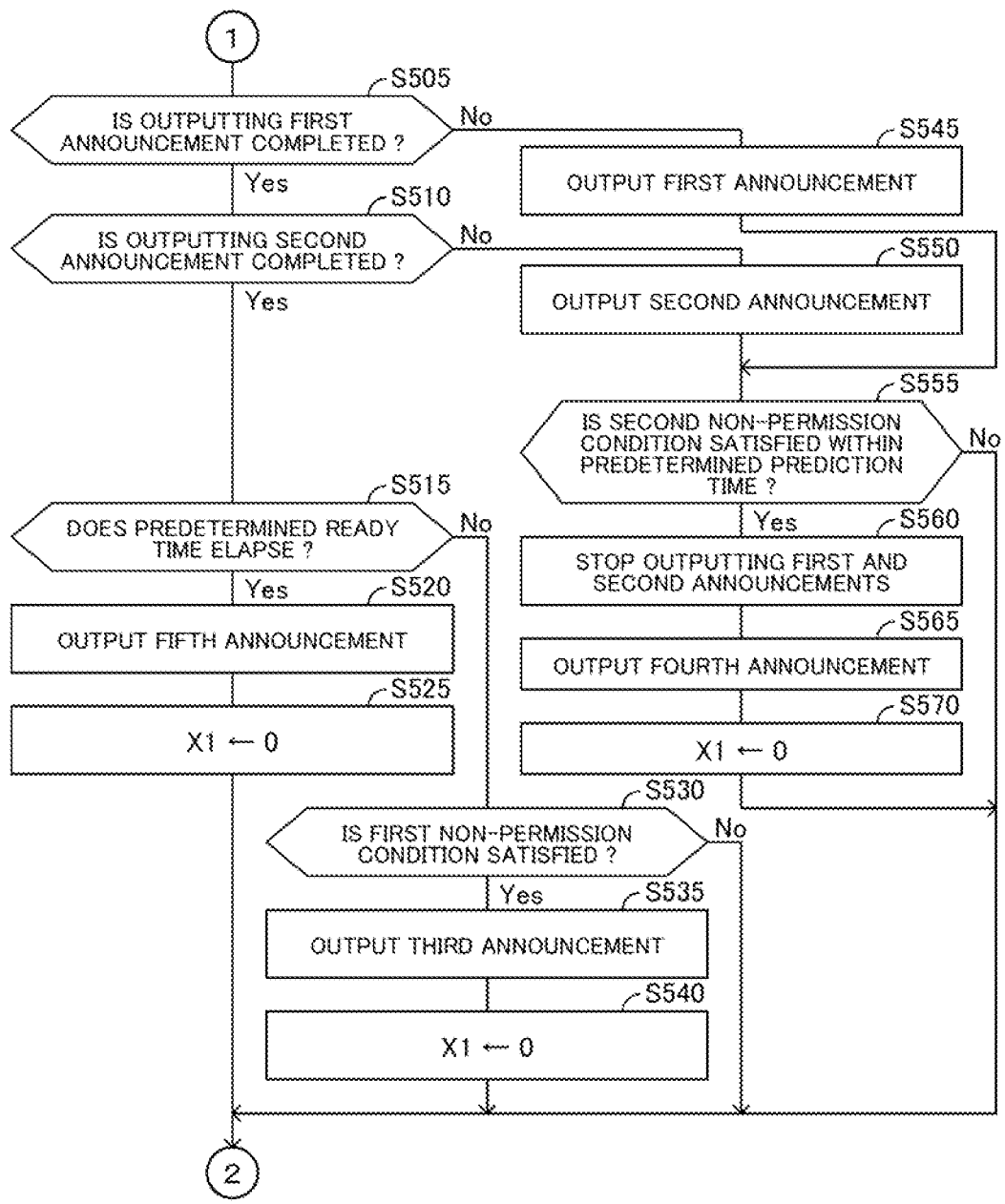
FIG. 8 is a view which shows a flowchart of a routine executed by the driving assistance control according to the embodiment of the invention.

Alternatively, the CPU may be configured or programmed to execute a routine shown in FIG. 8 in place of the routine shown in FIG. 5. In this case, when the CPU determines "No" at the step S410 of the routine shown in FIG. 4 and proceeds with the process to a step S505 of the routine shown in FIG. 8, the CPU determines whether outputting the first announcement is completed.

When the CPU determines "Yes" at the step S505, the CPU proceeds with the process to a step S510 to determine whether outputting the second announcement is completed.

When the CPU determines "Yes" at the step S510, the CPU proceeds with the process to a step S515 to determine whether the predetermined ready time Tw elapses since outputting the second announcement is completed.

When the CPU determines "Yes" at the step S515, the CPU proceeds with the process to a step S520 to output a fifth announcement from the speaker 221. The fifth announcement is an announcement to inform that the voice operation process is not executed. In this regard, the fifth announcement may include an announcement to inform reasons for not executing the voice operation process. Then, the CPU proceeds with the process to a step S525 to set the value of the processing flag X1 to "0." Then, the CPU proceeds with the process to the step S495 of the routine shown in FIG. 4 to terminate executing this routine once.

On the other hand, when the CPU determines "No" at the step S515, the CPU proceeds with the process to a step S530 to determine whether a first non-permission condition is satisfied.

When the CPU determines "Yes" at the step S530, the CPU proceeds with the process to a step S535 to output the third announcement from the speaker 221. Then, the CPU proceeds with the process to a step S540 to set the value of the processing flag X1 to "0." Then, the CPU proceeds with the process to the step S495 of the routine shown in FIG. 4 to terminate executing this routine once.

On the other hand, when the CPU determines "No" at the step S530, the CPU proceeds with the process directly to the step S495 of the routine shown in FIG. 4 to terminate executing this routine once.

Further, when the CPU determines "No" at the step S505, the CPU proceeds with the process to a step S545 to output or continue outputting the first announcement from the speaker 221. Then, the CPU proceeds with the process to a step S555.

Further, when the CPU determines "No" at the step S510, the CPU proceeds with the process to a step S550 to output or continue outputting the second announcement from the speaker 221. Then, the CPU proceeds with the process to a step S555.

When the CPU proceeds with the process to the step S555, the CPU determines whether the second non-permission condition is predicted to become satisfied within the predetermined prediction time Tp.

When the CPU determines "Yes" at the step S555, the CPU proceeds with the process to a step S560 to stop outputting the first announcement when the first announcement is output from the speaker 221 and stop outputting the second announcement when the second announcement is output from the speaker 221. Then, the CPU proceeds with the process to a step S565 to output the fourth announcement from the speaker 221. Then, the CPU proceeds with the process to a step S570 to set the value of the processing flag X1 to "0." Then, the CPU proceeds with the process to the step S495 of the routine shown in FIG. 4 to terminate executing this routine once.

On the other hand, when the CPU determines "No" at the step S555, the CPU proceeds with the process directly to the step S495 of the routine shown in FIG. 4 to terminate executing this routine once.

Figure 9:
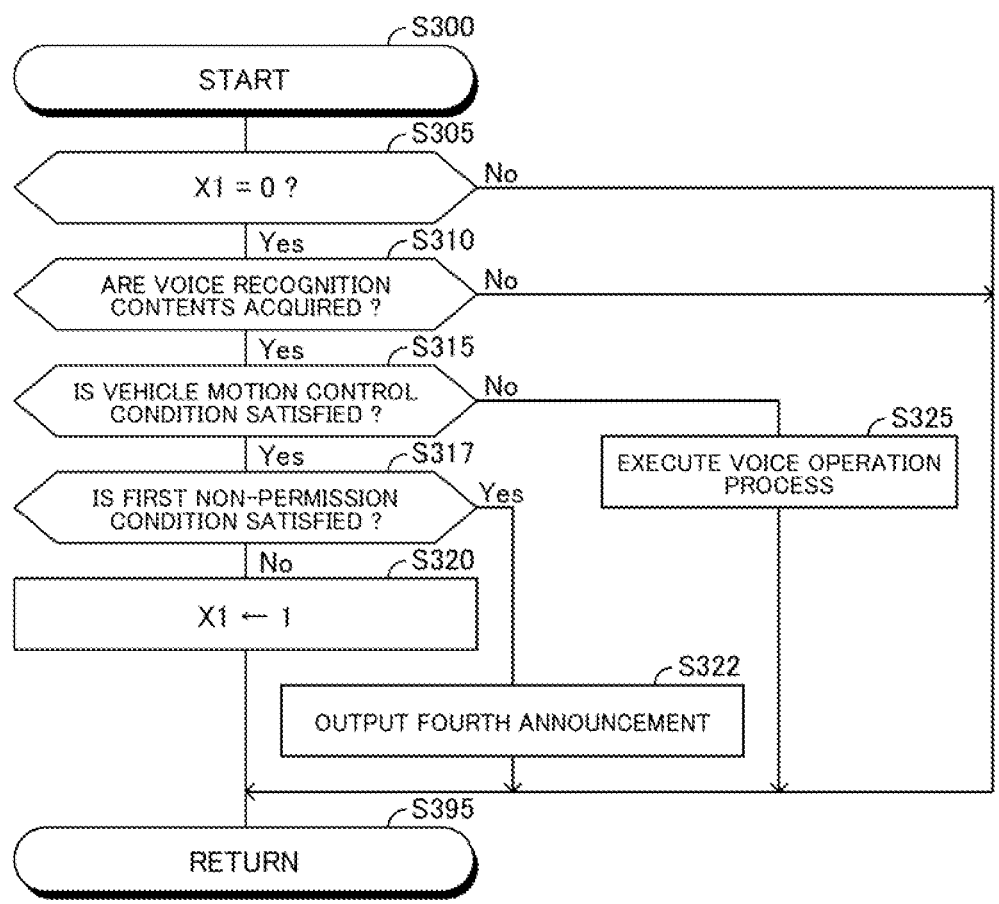
FIG. 9 is a view which shows a flowchart of a routine executed by the driving assistance control according to the embodiment of the invention.

Alternatively, the CPU may be configured or programmed to execute a routine shown in FIG. 9 in place of the routine shown in FIG. 3. The routine shown in FIG. 9 is the same as the routine shown in FIG. 7 except that a process of the step S317 of the routine shown in FIG. 9 is different from the process of the step S317 of the routine shown in FIG. 7. When the CPU proceeds with the process to a step S317 of the routine shown in FIG. 9, the CPU determines whether the first non-permission condition is satisfied. When the CPU determines "Yes" at the step S317, the CPU proceeds with the process to a step S320. On the other hand, when the CPU determines "No" at the step S317, the CPU proceeds with the process to a step S322.

Figure 10:
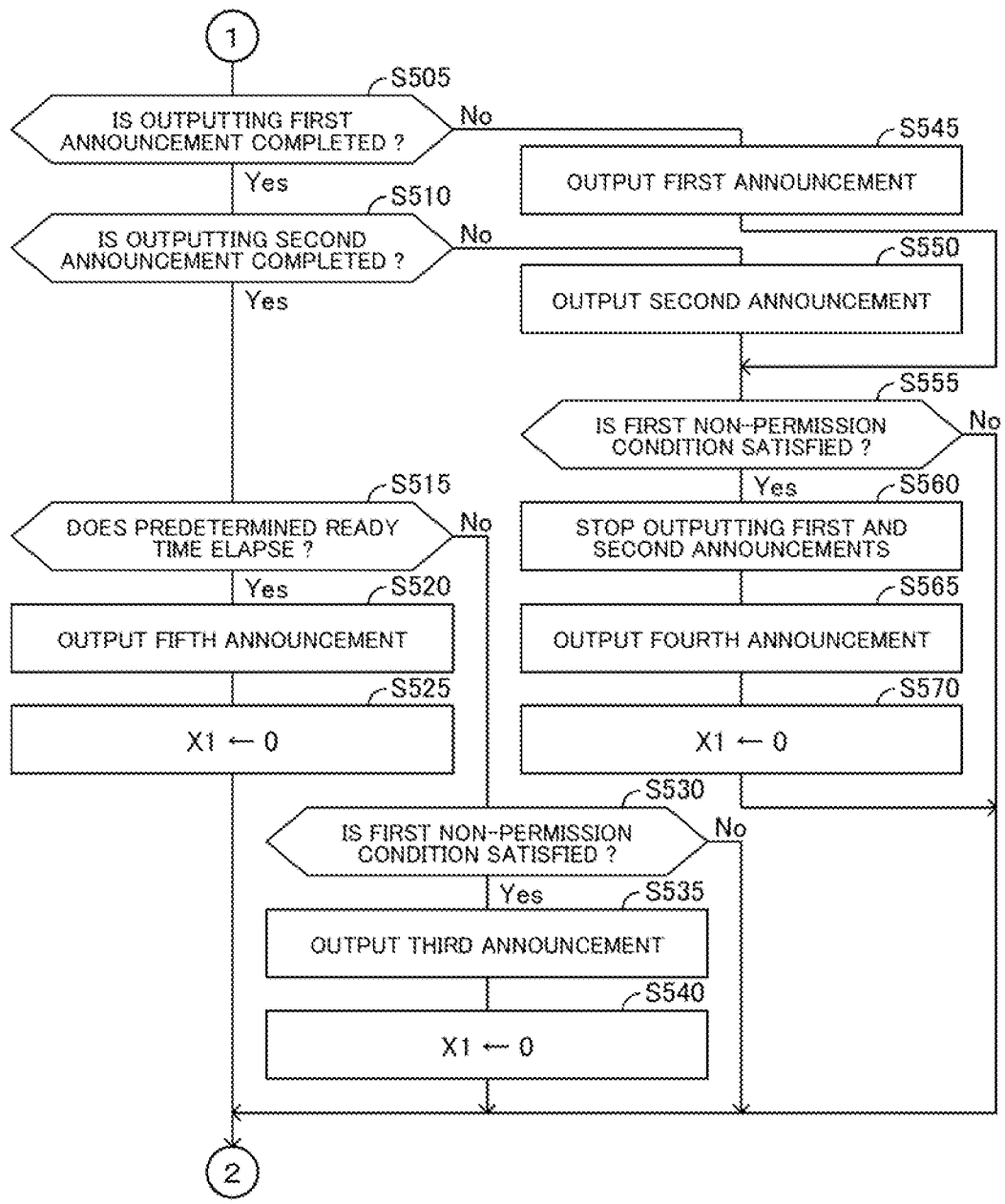
FIG. 10 is a view which shows a flowchart of a routine executed by the driving assistance control according to the embodiment of the invention.

Alternatively, the CPU may be configured or programmed to execute a routine shown in FIG. 10 in place of the routine shown in FIG. 5. The routine shown in FIG. 10 is the same as the routine shown in FIG. 8 except that a process of the step S555 of the routine shown in FIG. 10 is different from the process of the step S555 of the routine shown in FIG. 8. When the CPU proceeds with the process to a step S555 of the routine shown in FIG. 10, the CPU determines whether the first non-permission condition is satisfied. When the CPU determines "Yes" at the step S555, the CPU proceeds with the process to a step S560. On the other hand, when the CPU determines "No" at the step S555, the CPU proceeds with the process to the step S495 of the routine shown in FIG. 4.

The specific operations of the driving assistance apparatus 10 have been described.

What is claimed is:

1. A driving assistance apparatus, comprising an electronic control unit configured to execute a moving control to autonomously control a vehicle,
the electronic control unit being configured to:
  (i) inform a driver of the vehicle of contents of a voice operation process planned to be executed for the moving control in accordance with utterance contents of the driver acquired by voice recognition; and
  (ii) execute the voice operation process when an approval operation to approve the informed contents, is performed by the driver,
wherein the electronic control unit is configured to:
  (i) cancel a plan to execute the voice operation process and inform the driver that executing the voice operation process is not permitted when a moving situation of the vehicle becomes a predetermined situation which does not permit executing the voice operation process after the electronic control unit informs the driver of the contents of the voice operation process planned to be executed for the moving control and before the approval operation is performed; or (ii) cancel the plan to execute the voice operation process and inform the driver that executing the voice operation process is not permitted when the moving situation of the vehicle is predicted to become the predetermined situation after the electronic control unit informs the driver of the contents of the voice operation process planned to be executed for the moving control and before the approval operation is performed; or (iii) cancel the plan to execute the voice operation process and inform the driver that executing the voice operation process is not permitted when the moving situation of the vehicle becomes the predetermined situation when and after the electronic control unit acquires the utterance contents of the driver by the voice recognition and before the electronic control unit completes informing the driver of the contents of the voice operation process planned to be executed for the moving control; or (iv) cancel the plan to execute the voice operation process and inform the driver that executing the voice operation process is not permitted when the moving situation of the vehicle is predicted to become the predetermined situation when and after the electronic control unit acquires the utterance contents of the driver by the voice recognition and before the electronic control unit completes informing the driver of the contents of the voice operation process planned to be executed for the moving control.

2. A driving assistance method of executing a moving control to autonomously control a vehicle, the driving assistance method comprising steps of:

(i) informing a driver of the vehicle of contents of a voice operation process planned to be executed for the moving control in accordance with utterance contents of the driver acquired by voice recognition; and (ii) executing the voice operation process when an approval operation to approve the informed contents, is performed by the driver, wherein the driving assistance method comprises steps of:

(i) cancelling a plan to execute the voice operation process and informing the driver that executing the voice operation process is not permitted when a moving situation of the vehicle becomes a predetermined situation which does not permit executing the voice operation process after informing the driver of the contents of the voice operation process planned to be executed for the moving control and before the approval operation is performed; or (ii) cancelling the plan to execute the voice operation process and informing the driver that executing the voice operation process is not permitted when the moving situation of the vehicle is predicted to become the predetermined situation after informing the driver of the contents of the voice operation process planned to be executed for the moving control and before the approval operation is performed; or (iii) cancelling the plan to execute the voice operation process and informing the driver that executing the voice operation process is not permitted when the moving situation of the vehicle becomes the predetermined situation when and after acquiring the utterance contents of the driver by the voice recognition and before completing informing the driver of the contents of the voice operation process planned to be executed for the moving control; or (iv) cancelling the plan to execute the voice operation process and informing the driver that executing the voice operation process is not permitted when the moving situation of the vehicle is predicted to become the predetermined situation when and after acquiring the utterance contents of the driver by the voice recognition and before completing informing the driver of the contents of the voice operation process planned to be executed for the moving control.

3. A non-transitory computer-readable storage medium storing a driving assistance program configured to execute a moving control to autonomously control a vehicle, the driving assistance program being configured to:

(i) inform a driver of the vehicle of contents of a voice operation process planned to be executed for the moving control in accordance with utterance contents of the driver acquired by voice recognition; and (ii) execute the voice operation process when an approval operation to approve the informed contents, is performed by the driver, wherein the driving assistance program is configured to:

(i) cancel a plan to execute the voice operation process and inform the driver that executing the voice operation process is not permitted when a moving situation of the vehicle becomes a predetermined situation which does not permit executing the voice operation process after informing the driver of the contents of the voice operation process planned to be executed for the moving control and before the approval operation is performed; or (ii) cancel the plan to execute the voice operation process and inform the driver that executing the voice operation process is not permitted when the moving situation of the vehicle is predicted to become the predetermined situation after informing the driver of the contents of the voice operation process planned to be executed for the moving control and before the approval operation is performed; or (iii) cancel the plan to execute the voice operation process and inform the driver that executing the voice operation process is not permitted when the moving situation of the vehicle becomes the predetermined situation when and after acquiring the utterance contents of the driver by the voice recognition and before completing informing the driver of the contents of the voice operation process planned to be executed for the moving control; or (iv) cancel the plan to execute the voice operation process and inform the driver that executing the voice operation process is not permitted when the moving situation of the vehicle is predicted to become the predetermined situation when and after acquiring the utterance contents of the driver by the voice recognition and before completing informing the driver of the contents of the voice operation process planned to be executed for the moving control.

* * * * *